(12) United States Patent
Ishii

(10) Patent No.: US 10,252,415 B2
(45) Date of Patent: Apr. 9, 2019

(54) HUMAN COLLABORATIVE ROBOT SYSTEM HAVING SAFETY ASSURANCE OPERATION FUNCTION FOR ROBOT

(71) Applicant: FANUC CORPORATION, Yamanashi (JP)

(72) Inventor: Yuki Ishii, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/865,399

(22) Filed: Jan. 9, 2018

(65) Prior Publication Data

US 2018/0200881 A1 Jul. 19, 2018

(30) Foreign Application Priority Data

Jan. 13, 2017 (JP) .................................. 2017-004059

(51) Int. Cl.
*B25J 9/00* (2006.01)
*B25J 9/16* (2006.01)
*B25J 19/06* (2006.01)

(52) U.S. Cl.
CPC ........... *B25J 9/0081* (2013.01); *B25J 9/1633* (2013.01); *B25J 9/1674* (2013.01); *B25J 19/06* (2013.01)

(58) Field of Classification Search
CPC ....... B25J 9/0081; B25J 9/1633; B25J 9/1674
See application file for complete search history.

(56) References Cited

U.S. PATENT DOCUMENTS

| 6,212,443 | B1 | 4/2001 | Nagata et al. | |
|---|---|---|---|---|
| 8,396,594 | B2 | 3/2013 | Okazaki | |
| 9,242,380 | B2 | 1/2016 | Komatsu et al. | |
| 2009/0105880 | A1* | 4/2009 | Okazaki | B25J 9/1633 700/258 |
| 2010/0152896 | A1 | 6/2010 | Komatsu et al. | |
| 2015/0081099 | A1 | 3/2015 | Komatsu et al. | |
| 2015/0209961 | A1* | 7/2015 | Komatsu | B25J 9/1676 700/255 |

(Continued)

FOREIGN PATENT DOCUMENTS

| DE | 69622572 T2 | 4/2003 |
|---|---|---|
| DE | 102016100727 A1 | 7/2016 |

(Continued)

*Primary Examiner* — Khoi H Tran
*Assistant Examiner* — Robert T Nguyen
(74) *Attorney, Agent, or Firm* — RatnerPrestia

(57) ABSTRACT

A human-collaborative robot system includes a first force detection section that detects external force acting on a robot; a second force detection section that detects only an operating force acting on the robot when a human manually operates the robot; and a safety assurance operation command section that, in the case where the external force detected by the first force detection section exceeds a predetermined threshold value, commands a safety assurance operation of causing the robot to move in a direction that reduces the external force or causing the robot to stop. When the human is manually operating the robot while the robot is in the stopped state, the safety assurance operation command section compares a value obtained by subtracting the operating force detected by the second force detection section from the external force detected by the first force detection section with a predetermined threshold value.

4 Claims, 3 Drawing Sheets

(56) References Cited

U.S. PATENT DOCUMENTS

| | | | |
|---|---|---|---|
| 2016/0167231 A1* | 6/2016 | Nakayama | B25J 9/1676 |
| | | | 700/255 |
| 2016/0214261 A1 | 7/2016 | Davis et al. | |
| 2016/0243700 A1* | 8/2016 | Naitou | B25J 9/1633 |
| 2016/0243705 A1* | 8/2016 | Naitou | B25J 13/085 |
| 2016/0346935 A1* | 12/2016 | Nakayama | B25J 13/085 |
| 2017/0028553 A1* | 2/2017 | Tsuda | B25J 13/084 |
| 2017/0028565 A1* | 2/2017 | Matsudaira | B25J 9/1674 |
| 2017/0285625 A1* | 10/2017 | Sato | B25J 9/0081 |
| 2018/0107174 A1* | 4/2018 | Takahashi | G05B 9/02 |
| 2018/0154526 A1* | 6/2018 | Oguri | B25J 9/1692 |

FOREIGN PATENT DOCUMENTS

| | | |
|---|---|---|
| EP | 2189255 A1 | 5/2010 |
| JP | 4938118 B | 5/2012 |
| JP | 2015-199174 A | 11/2015 |
| JP | 5946859 B | 7/2016 |
| WO | 2014129110 A1 | 8/2014 |

* cited by examiner

HUMAN COLLABORATIVE ROBOT SYSTEM HAVING SAFETY ASSURANCE OPERATION FUNCTION FOR ROBOT

CROSS-REFERENCE TO RELATED APPLICATIONS

This application is a new U.S. Patent Application that claims benefit of Japanese Patent Application No. 2017-004059, filed Jan. 13, 2017, the disclosure of this application is being incorporated herein by reference in its entirety for all purposes.

BACKGROUND OF THE INVENTION

1. Field of the Invention

The present invention relates to a human-collaborative robot system having a safety assurance operation function for a robot.

2. Description of the Related Art

In a typical industrial robot, fine adjustments are sometimes made to the position and orientation of the robot by a worker applying force (operating force) directly to the robot (see JP 5946859 B, for example). Furthermore, what is known as "direct teaching", where teaching points are set by an operator applying operating force to a handle provided on a robot, is also generally used. In this specification, the above-described fine adjustment operation, direct teaching operation, lead-through operation, etc., will be referred to collectively as "hand-guided operation".

Recently, human-collaborative robot systems are being developed in which humans and robots are dispatched together on a factory floor, and manufacturing tasks are shared by the humans and robots (e.g., see JP 4938118 B).

In such a human-collaborative robot system, force acting between the robot and the human is monitored using a force sensor. The human-collaborative robot system has a function that, in a case where a force detected by the force sensor exceeds a predetermined value, stops the robot or moves the robot in a direction that reduces the force. Doing so ensures the safety of the human (e.g., see JP 2015-199174 A). The same function can be realized by using torque sensors arranged in each axis of the robot or current meters that detect current flowing in the motors driving the axes of the robot instead of the force sensor.

Another human-collaborative robot system includes a lead-through switch that switches hand-guided operation, such as lead-through operation, between being active and inactive. When the hand-guided operation is active, a function for stopping the robot, etc., is deactivated, whereas when the hand-guided operation is inactive, the function for stopping the robot, etc., is activated (e.g., see JP 2015-199174 A).

SUMMARY OF THE INVENTION

During hand-guided operation of a human-collaborative robot system, the robot is moved by force applied by a human, and thus, the function for stopping the robot, etc., is deactivated when the hand-guided operation is activated.

However, when the hand-guided operation is activated, i.e., when the function for stopping the robot, etc., is deactivated, the robot will not stop, etc., even in a case where the human and the robot come into contact with each other. In other words, there is a possibility that the safety of the human will no longer be ensured in a case where the hand-guided operation is activated.

In a case where the function for stopping the robot, etc., is activated while keeping the hand-guided operation active, the operating force will be included in the force detected by the force sensor. As such, the force detected by the force sensor will easily exceed the predetermined value, causing the robot to stop, etc., frequently. As a result, the hand-guided operation cannot be carried out favorably.

Thus, what is needed is a human-collaborative robot system in which hand-guided operation can be carried out favorably while ensuring the safety of a human, even in the case where hand-guided operation has been activated.

A first aspect of the present disclosure provides a human-collaborative robot system in which a robot and a human work collaboratively in a shared workspace, the system including: a first force detection section configured to detect external force acting on the robot; a second force detection section configured to detect only an operating force acting on the robot when the human manually operates the robot; and a safety assurance operation command section configured to compare external force detected by the first force detection section with a predetermined threshold value, and in the case where the external force exceeds the predetermined threshold value, command a safety assurance operation of causing the robot to move in a direction that reduces the external force or causing the robot to stop, wherein when the human is manually operating the robot while the robot is in a stopped state, the safety assurance operation command section compares a value obtained by subtracting the operating force detected by the second force detection section from the external force detected by the first force detection section with the predetermined threshold value.

In the first aspect, when the human is manually operating the robot while the robot is in the stopped state, i.e., during hand-guided operation, the operating force detected by the second force detection section is subtracted from the external force detected by the first force detection section so as to calculate a net external force. Accordingly, the safety assurance operation can be commanded on the basis of the net external force acting on the robot. Thus, the hand-guided operation can be carried out favorably while ensuring the safety of the human, even in the case where hand-guided operation has been activated.

The objects, features and advantages of the present invention will become more apparent from the following description of the embodiments in connection with the accompanying drawings.

DETAILED DESCRIPTION

Figure 1:
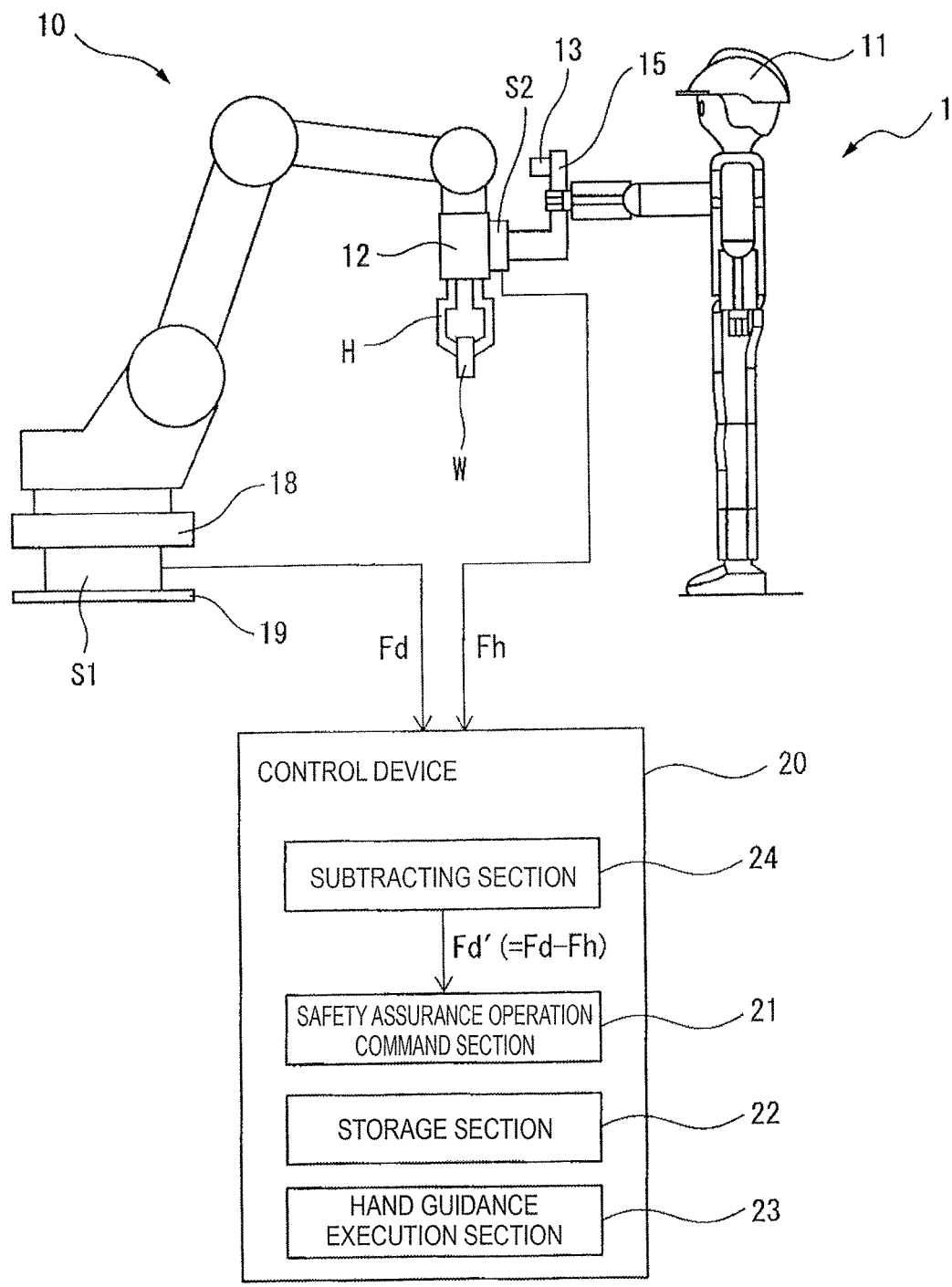
FIG. 1 is a schematic diagram illustrating a human-collaborative robot system based on a first embodiment.

Embodiments of the present invention will be described below with reference to the appended drawings. Throughout the drawings, corresponding components are denoted by common reference numerals. Scales in the drawings are changed as appropriate in order to facilitate understanding.

FIG. 1 is a schematic diagram illustrating a human-collaborative robot system based on a first embodiment. A human-collaborative robot system 1 mainly includes a robot 10, a control device 20 controlling the robot 10, and a human 11. The robot 10 is arranged near the human 11, and thus, in the human-collaborative robot system 1, the robot 10 and the human 11 can work collaboratively while sharing a workspace.

The robot 10 is a six-axis articulated robot, for example, and a hand H capable of gripping a workpiece W is provided on a tip end of the robot 10 via an adapter 12. Note that another end effector may be provided on the tip end of the robot 10 instead of the hand H.

A handle 15 that is gripped by an operator such as the human 11 when carrying out hand-guided operation is attached to the adapter 12. Furthermore, a base 18 of the robot 10 is fixed to the floor of a building, etc., by an anchor plate 19.

A first force detection section that detects external force acting on the robot 10, e.g. a first force sensor S1, is provided between the base 18 and the anchor plate 19. The first force sensor S1 is arranged below the base 18, and can therefore detect all external forces acting on the robot 10. Note that the first force detection section may instead be torque sensors arranged in each axis of the robot 10 or current meters that detect current flowing in the motors driving the axes of the robot 10. In such a case, external force acting on the robot 10 is estimated from the detected torque or current.

Furthermore, a second force detection section, e.g. a second force sensor S2, is arranged between the adapter 12 and the handle 15 of the robot 10. When carrying out hand-guided operation, an operator, e.g. the human 11, grips the handle 15 and applies a force (operating force) directly to the robot, which is in a stopped state. The second force sensor S2 detects only operating force acting on the robot 10 when the operator, e.g. the human 11, manually carries out hand-guided operation of the robot 10 in the stopped state. The second force sensor S2 is attached between the robot 10 and the handle 15, and thus, the second force sensor S2 detects only the operating force acting on the handle 15.

A hand guidance switch 13 is further provided on the handle 15. The operator, e.g. the human 11, grips the handle 15 and presses the hand guidance switch 13 when carrying out hand-guided operation. The hand-guided operation can be carried out while the hand guidance switch 13 is being pressed. However, the hand-guided operation cannot be carried out while the hand guidance switch 13 is not being pressed. A function for stopping the robot, etc., described later, is active regardless of whether or not the hand guidance switch 13 is being pressed.

The control device 20 illustrated in FIG. 1 is a digital computer that controls the robot 10, and includes a CPU and a storage section 22, e.g. memory. The control device 20 also includes a hand guidance execution section 23. The hand guidance execution section 23 causes the robot 10 to move to a desired position and orientation in accordance with the hand-guided operation of the operator, e.g. the human 11, while the hand guidance switch 13 is being pressed.

The control device 20 further includes a safety assurance operation command section 21 that compares the external force detected by the first force detection section S1 with a predetermined threshold value, and in a case where the external force exceeds a predetermined threshold value A, commands a safety assurance operation of causing the robot 10 to move in a direction that reduces the external force or causes the robot 10 to stop. The predetermined threshold value A is a value determined in advance through experiments, etc., and is stored in the storage section 22.

The control device 20 further includes a subtracting section 24 that subtracts the operating force detected by the second force detection section S2 from the external force detected by the first force detection section S1. The subtracting section 24 may be included in the safety assurance operation command section 21 as part of the functions of the safety assurance operation command section 21. Note that the functions of the above-described safety assurance operation command section 21, hand guidance execution section 23, and subtracting section 24 are realized by the CPU of the control device 20.

Figure 2:
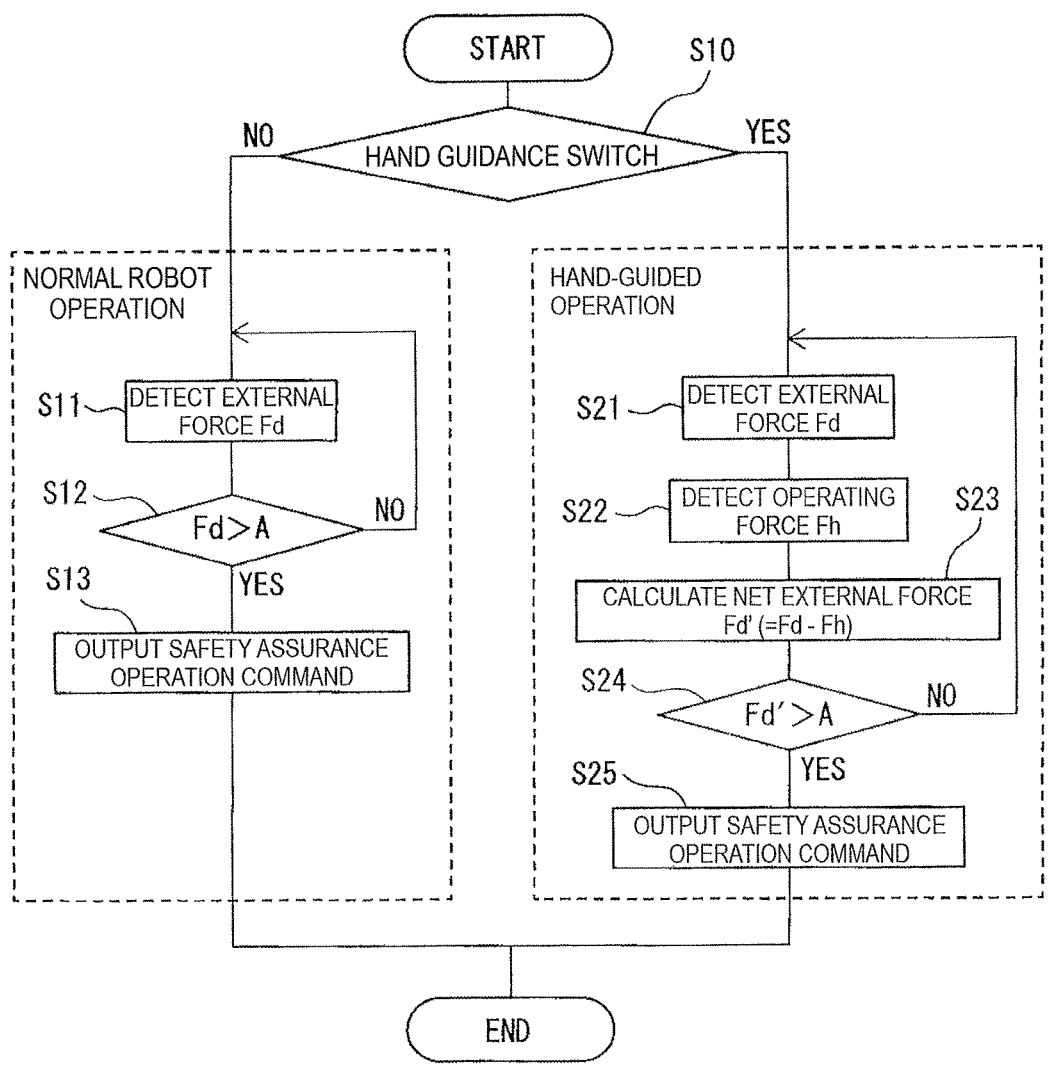
FIG. 2 is a flowchart illustrating operations of the human-collaborative robot system illustrated in FIG. 1.

FIG. 2 is a flowchart illustrating operations of the human-collaborative robot system illustrated in FIG. 1. The operations illustrated in FIG. 2 are carried out every predetermined control cycle. Operations of the human-collaborative robot system 1 based on the first embodiment will be described next with reference to FIG. 2.

First, in step S10, it is determined whether the hand guidance switch 13 is being pressed. In a case where the hand guidance switch 13 is not being pressed, it is determined that the human 11 is not carrying out a hand-guided operation, e.g. a fine adjustment operation, a direct teaching operation, or a lead-through operation, on the robot in a stopped state. In other words, it is determined that the hand-guided operation is not active and that the robot 10 is operating normally according to a predetermined operation program, and the process advances to step S11.

In step S11, the first force sensor S1 detects external force Fd acting on the robot 10. Then, in step S12, the safety assurance operation command section 21 compares the external force Fd with the predetermined threshold value A. In a case where it is determined that the external force Fd exceeds the threshold value A, it is determined that the robot 10 has collided with the human 11, etc.

In such a case, the process advances to step S13, and the safety assurance operation command section 21 commands the safety assurance operation. As a result, the robot 10 moves in a direction that reduces the external force or the robot 10 is stopped, and the safety of the human 11 is assured. Note that in a case where it is determined in step S12 that the external force Fd does not exceed the threshold value A, the process returns to step S11, and the above-described processing is iterated until the operation program of the robot 10 ends.

In contrast, in a case where the hand guidance switch 13 is being pressed in step S10, it is determined that the human 11 is carrying out a hand-guided operation manually on the robot 10 in the stopped state, and thus, it can be determined that the robot 10 is operated according to the hand guidance execution section 23. In other words, it is determined that the hand-guided operation is active and that the robot 10 is not operating according to the predetermined operation program and the process advances to step S21.

In step S21, the first force sensor S1 detects external force Fd acting on the robot 10. Then, in step S22, the second force sensor S2 detects an operating force Fh acting on the robot 10. Then, in step S23, the subtracting section 24 subtracts the operating force Fh from the external force Fd, and actual external force or force Fd' not acting on the robot 10 is calculated.

Then, in step S24, the safety assurance operation command section 21 compares the external force Fd' with the predetermined threshold value A. In a case where it is determined that the external force Fd' exceeds the threshold value A, it is determined that the robot 10 has collided with the human 11, etc., and thus the process advances to step S25, where the safety assurance operation is commanded as described above. The safety of the human 11 is assured as a result. Note that in a case where it is determined in step S24 that the external force Fd' does not exceed the threshold value A, the process returns to step S21, and the above-described processing is iterated.

Thus, in the first embodiment, during hand-guided operation, i.e., when the human 11 is manually carrying out a hand-guided operation of the robot 10 in the stopped state, the operating force detected by the second force sensor S2 is subtracted from the external force detected by the first force sensor S1 to calculate the net external force acting on the robot 10.

The net external force does not include the operating force, and thus, in a case where the safety assurance operation is commanded on the basis of the net external force, the safety of the human can be assured without frequently stopping the robot, etc. Thus, the hand-guided operation can be carried out favorably while ensuring the safety of the human, even in the case where hand-guided operation has been activated.

Figure 3:
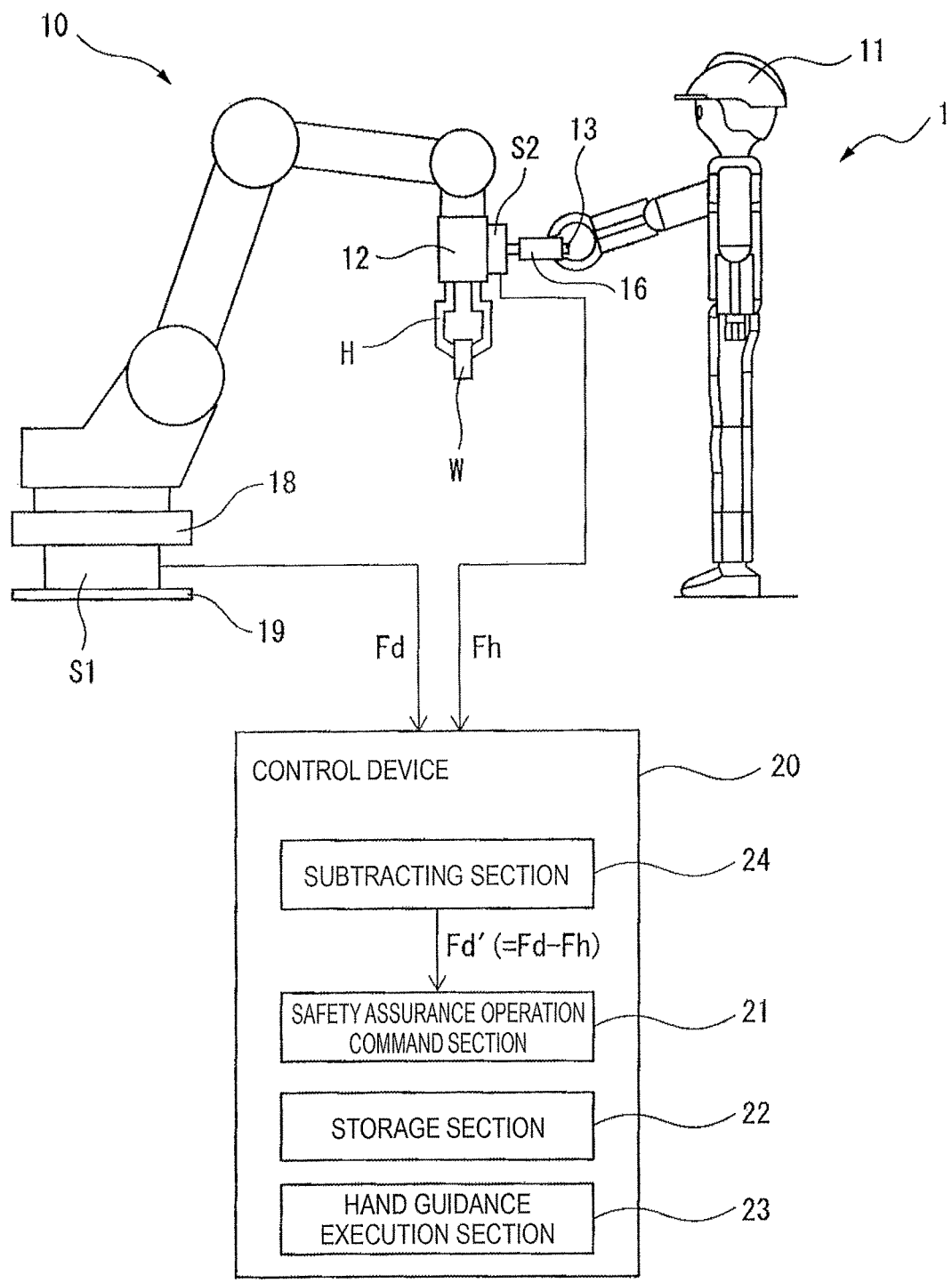
FIG. 3 is a schematic diagram illustrating a human-collaborative robot system based on a second embodiment.

FIG. 3 is a schematic diagram illustrating a human-collaborative robot system based on a second embodiment. The second embodiment is generally the same as the content illustrated in FIG. 1, and thus only the differences will be described hereinafter.

In FIG. 3, a physical amount input section 16 is provided on the adapter 12 of the robot 10 instead of the handle 15. The physical amount input section 16 is a device into which the human 11 directly enters a physical amount, e.g. a tilt angle or a force, and carries out hand-guided operation through the hand guidance execution section 23. The physical amount input section 16 is, for example, a joystick as illustrated in FIG. 3, but the physical amount input section 16 may be a lever, a trackball, a touch panel, etc.

In the second embodiment, the second force sensor S2 calculates the operating force through a predetermined formula on the basis of a physical amount applied to the physical amount input section 16 used by the human 11 to operate the robot 10 in the stopped state. In FIG. 3, the hand guidance switch 13 is attached to a part of the physical amount input section 16, e.g. the tip of the joystick 16. Alternatively, the hand guidance switch 13 may be omitted, and the hand-guided operation may activate automatically while the physical amount input section 16 is being operated.

The human-collaborative robot system 1 according to the second embodiment clearly has generally the same actions as the first embodiment described with reference to FIG. 2, and thus also falls within the scope of the present invention.

Aspects of the Disclosure

A first aspect provides a human-collaborative robot system (1) in which a robot (10) and a human (11) work collaboratively in a shared workspace, the system including: a first force detection section (S1) configured to detect external force acting on the robot; a second force detection section (S2) configured to detect only an operating force acting on the robot when the human manually operates the robot; and a safety assurance operation command section (21) configured to compare the external force detected by the first force detection section with a predetermined threshold value, and in the case where the external force exceeds the predetermined threshold value, command a safety assurance operation of causing the robot to move in a direction that reduces the external force or causing the robot to stop, wherein when the human is manually operating the robot while the robot is in a stopped state, the safety assurance operation command section compares a value obtained by subtracting the operating force detected by the second force detection section from the external force detected by the first force detection section with the predetermined threshold value.

According to a second aspect, in the first aspect, the first force detection section is attached to a base (18) of the robot.

According to a third aspect, in the first or second aspect, the second force detection section is attached between a handle (15) used by the human to operate the robot while the robot is in a stopped state and the robot.

According to a fourth aspect, in the first or second aspect, the second force detection section calculates the operating force on the basis of a physical amount applied to a physical amount input section (16) used by the human to operate the robot while the robot is in a stopped state.

Effects of Aspects

In the first aspect, when the human is manually operating the robot while the robot is in the stopped state, i.e., during hand-guided operation, the operating force detected by the second force detection section is subtracted from the external force detected by the first force detection section. Accordingly, the safety assurance operation can be commanded on the basis of the net external force acting on the robot. Thus, the hand-guided operation can be carried out favorably while ensuring the safety of the human, even in the case where hand-guided operation has been activated.

In the second aspect, all of the external force acting on the robot can be detected.

In the third aspect, only the operating force acting on the handle can be detected.

In the fourth aspect, the operating force can be calculated from a predetermined formula, etc., even in the case where a physical amount input section is provided. The physical amount input section is a joystick, a lever, a trackball, a touch panel, etc.

Although the present invention has been described using a representative embodiment, it will be clear to one skilled in the art that the above-described variations, as well as other modifications, omissions, and additions, can be made without departing from the scope of the present invention.

The invention claimed is:

1. A human-collaborative robot system in which a robot and a human work collaboratively in a shared workspace, the system comprising:
   a first force detection section configured to detect external force acting on the robot;
   a second force detection section configured to detect only an operating force acting on the robot when the human manually operates the robot; and
   a safety assurance operation command section configured to compare the external force detected by the first force detection section with a predetermined threshold value, and in the case where the external force exceeds the predetermined threshold value, command a safety assurance operation of causing the robot to move in a direction that reduces the external force or causing the robot to stop,
   wherein when the human is manually operating the robot while the robot is in a stopped state, instead of comparing the external force detected by the first force detection section with the predetermined threshold value the safety assurance operation command section is configured to compare a value obtained by subtracting the operating force detected by the second force detection section from the external force detected by the first force detection section with the predetermined threshold value, and in the case where the value obtained by subtracting the operating force detected by the second force detection section from the external force detected by the first force detection section exceeds the predetermined threshold value, command the safety assurance operation of causing the robot to move in the direction that reduces the value obtained by subtracting the operating force detected by the second force detection section from the external force or causing the robot to stop.

2. The human-collaborative robot system of claim 1, wherein the first force detection section is attached to a base of the robot.

3. The human-collaborative robot system of claim 1, wherein the second force detection section is attached between a handle used by the human to operate the robot while the robot is in a stopped state and the robot.

4. The human-collaborative robot system of claim 1, wherein the second force detection section calculates the operating force on the basis of a physical amount applied to a physical amount input section used by the human to operate the robot while the robot is in a stopped state.

* * * * *